US008263144B2

(12) United States Patent
Koka et al.

(10) Patent No.: US 8,263,144 B2
(45) Date of Patent: Sep. 11, 2012

(54) CHEESE FLAVOR COMPOSITION AND PROCESS FOR MAKING SAME

(75) Inventors: Ramarathna Koka, Mount Prospect, IL (US); Benjamin E. Dias, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 811 days.

(21) Appl. No.: 11/281,276

(22) Filed: Nov. 17, 2005

(65) Prior Publication Data
US 2007/0110848 A1 May 17, 2007

(51) Int. Cl.
*A23C 9/12* (2006.01)
(52) U.S. Cl. ........................................ 426/36
(58) Field of Classification Search .................... 426/36
See application file for complete search history.

(56) References Cited

U.S. PATENT DOCUMENTS

| | | | | |
|---|---|---|---|---|
| 4,595,594 A * | 6/1986 | Lee et al. | | 426/35 |
| 4,708,876 A | 11/1987 | Yokoyama et al. | | |
| 4,888,284 A * | 12/1989 | Konings et al. | | 435/183 |
| 5,372,941 A * | 12/1994 | Peters et al. | | 435/198 |
| 6,214,585 B1 | 4/2001 | Kwon et al. | | |
| 6,214,596 B1 | 4/2001 | Asgharian et al. | | |
| 6,406,724 B1 | 6/2002 | Reddy et al. | | |
| 6,562,383 B1 | 5/2003 | Moran et al. | | |
| 6,586,025 B2 | 7/2003 | Yvon et al. | | |
| 6,649,199 B2 | 11/2003 | Bigret | | |
| 6,649,200 B2 | 11/2003 | Smith et al. | | |

FOREIGN PATENT DOCUMENTS

| | | |
|---|---|---|
| EP | 0 322 181 A2 | 6/1989 |
| EP | 0 977 496 A1 | 2/2000 |
| WO | 96/10927 A1 | 4/1996 |
| WO | 01/30172 | 5/2001 |
| WO | 02/085131 | 10/2002 |

OTHER PUBLICATIONS

Garcia, H. S. et al. 1998. Lipolysis of butteroil over an immobilized calf pre-gastric esterase: variation of rate and product distribution with temperature. Biotechnol. letters. 4: 403-405.*
Urbach, G., Contribution of Lactic Acid Bacteria to Flavor Compound Formation in Dairy Products, *Int'l Dairy J.*, 1995, 3:389-422.
Fox, P., Cheese: Chemistry, Physics and Microbiology, pp. 389-483, 1993.
Yvon, et al., "Cheese flavour formation by amino acid catabolism," *Int. Dairy J. 11* (2001) 185-201.
Yvon, et al., "Adding"-Ketoglutarate to Semi-hard Cheese Curd Highly Enhances the Conversion of Amino Acids to Aroma Compounds, *Int. Dairy J. 8* (1998) 889-898.
Banks, et al., "Enhancement of amino acid catabolism in Cheddar cheese using -ketoglutarate . . . ," *Int. Dairy J. 11* (2001) 235-243.
Upadhya, et al., "D-Amino Acid oxidase and catalase of detergent permeabilized *Rhodotorula gracilus* cells and its potential use for the synthesis of -keto acids," Process Biochem., 35 (1999) 7-13.

A. G. Williams et al., "Energy Sources of Non-Starter Lactic Acid Bacteria Isolated from Cheddar Cheese," International Dairy Journal, 2000, 10 (1/2) 17-23 (Abstract, 1 page).
M. W. Atiles et al., "Gene Cloning, Sequencing, and Inactivation of the Branched-Chain Aminotransferase of *Lactococcus lactis* LM0230," Applied and Environmental Microbiology, 2000, 66 (6) 2325-2329 (Abstract, 1 page).
L. Rijnen et al., "Inactivation of Lactococcal Aromatic Aminotransferase Prevents the Formation of Floral Aroma Compounds from Aromatic Amino Acids in Semi-hard Cheese," International Dairy Journal, 1999, 9 (12) 877-885 (Abstract, 1 page).
B. Dias and B. Weimer, "Conversion of Methionine to Thiols by *Lactococci, Lactobacilli*, and *Brevibacteria*," Applied and Environmental Microbiology, 1998, 64 (9) 3320-3326 (Abstract, 1 page).
M. Yvon et al., "An Aminotransferase from *Lactococcus lactis* Initiates Conversion of Amino Acids to Cheese Flavor Compounds," Applied and Environmental Microbiology, 1997, 63 (2) 414-419 (Abstract, 1 page).
K. H. Ney, "Study of the Flavour of Ziegerklee (*Coerulea Mellilotus*) Clover, the Key Flavour Component of Schabzieger (Swiss Herb Cheese)," Gordian, 1986, 86 (112) 9-10 (Abstract, 1 page).
J. W. Harper and J. A. Wang, "Amino Acid Catabolism in Cheddar Cheese Slurries. III. Selected Products from Glutamic Acid," Milchwissenschaft, 1981, 36 (2) 70-72 (Abstract, 1 page).
Y. C. Lin et al., "Carbohydrate-Derived Metabolic Compounds in Cheddar Cheese," Milchwissenschaft, 1979, 34 (2) 69-73 (Abstract, 1 page).
K. H. Ney et al., "Investigation of the Flavour Components of Fontina, an Italian Cheese," Fette Seifen Anstrichmittel, 1978, 80 (6) 249-251 (Abstract, 1 page).
K. H. Ney, "Techniques of Flavour Investigation," Gordian, 1973, 73 (10) 380, 382, 384, 387 (Abstract, 1 page).
K. H. Ney and I. P. G. Wirotama, "Unsubstituted Aliphatic Monocarboxylic Acids and ALPHA-Keto-Acids in Camembert Cheese," Zeitschrift fuer Lebensmittel-Untersuchung und-Forschung, 1973, 152 (1) 32-34 (Abstract, 1 page).
Y. C. Lin, "Carbohydrate Fermentation in Cheddar Curd Ripening," Dissertation Abstracts International. Section B. The Sciences and Engineering, 1971, 32 (3) 1647 (Abstract, 1 page).
J. W. Harper and T. Kristofferson, "Biochemistry of Flavour Development in Cheese Slurry Systems," American Chemical Society, 1969, 158 (Abstract, 1 page).
H. Tanako and Y. Obata, "Studies on the Formation of Cheese-like Flavour," Agricultural and Biological Chemistry, 1969, 33 (2) 147-150 (Abstract, 1 page).
J. Banks, "Transaminase Activity in the Enhancement of Cheddar Aroma," Yearbook, 2001, 16 (2 ref.) (Abstract, 1 page).

(Continued)

*Primary Examiner* — D Lawrence Tarazano
*Assistant Examiner* — Hamid R Badr
(74) *Attorney, Agent, or Firm* — Fitch, Even, Tabin & Flannery, LLP

(57) ABSTRACT

The present invention provides a cheese flavor composition and a process for preparing a cheese flavor composition comprising the steps of (a) contacting a protein containing dairy product with a lactic acid culture to form a reaction mixture at a temperature of about 25 to about 45° C. for about 8 to about 72 hours to provide peptides and free amino acids and, (b) contacting the peptides and free amino acids within the reaction mixture with amino acid oxidase to deaminated the peptides and free amino acids to provide α-keto acids, wherein the α-keto acids are further metabolized within the reaction mixture to provide flavor compounds. The present invention also provides a food product comprising the cheese flavor composition.

20 Claims, No Drawings

OTHER PUBLICATIONS

Various Authors, "Oral Presentations: Amino Acid Catabolism in Cheese," Cheese Ripening and Technology: Abstracts of a Symposium, Banff, Mar. 2000, 20-29, International Dairy Federation (Abstract, 1 page).

"Harnessing Biotechnology," Muir D. Milk Industry International, Sep. 2000, 102 (9), Supplement, 4-5 (Abstract, 1 page).

P. L. H. McSweeney and M. J. Sousa, "Biochemical Pathways for the Production of Flavour Compounds in Cheeses During Ripening: A Review," Lait, May-Jun. 2000, 80 (3), 293-324 (Abstract, 1 page).

L. Rijnen et al., "Expression of a Heterologous Glutamate Dehydrogenase Gene in *Lactococcus lactis* Highly Improves the Conversion of Amino Acids to Aroma Compounds," Applied and Environmental Microbiology, Apr. 2000, 66 (4), 1354-1359 (Abstract, 1 page).

L. Rijnen et al., "Inactivation of Lactococcal Aromatic Aminotransferase Prevents the Formation of Floral Aroma Compounds from Aromatic Amino Acids in Cheese," International Dairy Journal, 1999, 9 (12), 877-885 (Abstract, 1 page).

M. Yvon et al., "Adding Alpha-Ketoglutarate to Semi-hard Cheese Curd Highly Enhances the Conversion of Amino Acids to Aroma Compounds," International Dairy Journal, 1998, 8 (10-11), 889-898 (Abstract, 1 page).

A. Reps et al., "Carbonyl Compounds Produced by the Growth of *Lactobacillus bulgaricus*," Journal of Dairy Science, 1987, 70 (3), 559-562 (Abstract, 1 page).

K. H. Ney, "Flavour of Tilsit Cheese," Fette Seifen Anstrichmittel, 1985, 87 (7), 289-294 (Abstract, 1 page).

B. Dias and B. Weimer, "Purification and Characterization of L-Methionine Gamma-Lyase from *Brevibacterium linens* BL2," Applied and Environmental Microbiology, Sep. 1998, 64 (9), 3327-3331 (Abstract, 1 page).

P. L. H. McSweeney et al., "Flavours and Off-Flavours in Milk and Dairy Products," Advanced Dairy Chemistry, 1997, vol. 3: Lactose, Water, Salts and Vitamins, 403-468 (Abstract, 1 page).

W. J. M. Engels et al., "Partial Purification and Characterization of Two Aminotransferases from *Lactococcus lactis* Subsp. *cremoris* B78 Involved in the Catabolism of Methionine and Branched-Chain Amino Acids," International Dairy Journal, 2000, 10 (7), 443-452 (Abstract, 1 page).

K. H. Ney and I. P. G. Wirotama, "Flavor of Edelpilzkaese, a German Blue Mold Cheese," Z. Lebensm-Unters Forsch, 1972, 149 (5), 275-279 (Abstract, 2 pages).

K. H. Ney and I. P. G. Wirotama, "Unsubstituted Aliphatic Monocarboxylic Acids, α-Keto Acids, and Amines in Cheddar Cheese Flavor," Z. Lebensm-Unters Forsch, 1971, 146 (6), 337-343 (Abstract, 2 pages).

M. Bourdat-Deschamps et al., "Autolysis of *Lactococcus lactis* AM2 Stimulates the Formation of Certain Aroma Compounds from Amino Acids in a Cheese Model," International Dairy Journal, 2004, 14 (9), 791-800 (Abstract, 1 page).

J. R. Broadbent et al., "Overexpression of *Lactobacillus casei* D-Hydroxyisocaproic Acid Dehydrogenase in Cheddar Cheese," Applied and Environmental Microbiology, 2004, 70 (8), 4814-4820 (Abstract, 1 page).

S. Helinck et al., "Ability of Thermophilic Lactic Acid Bacteria to Produce Aroma Compounds from Amino Acids," Applied and Environmental Microbiology, 2004, 70 (7), 3855-3861 (Abstract, 1 page).

B. Ganesan and B. C. Weimer, "Role of Aminotransferase IlvE in Production of Branched-Chain Fatty Acids by *Lactococcus lactis* Subsp. *lactis*.," Applied and Environmental Microbiology, 2004, 70 (1), 638-641 (Abstract, 1 page).

B. Thage et al., "Purification and Characterization of a Branched-Chain Amino Acid Aminotransferase from *Lactobacillus paracasei* Subsp. *paracasei* CHCC 2115," Journal of Applied Microbiology, 2004, 96 (3), 593-602 (Abstract, 1 page).

B. Ganesan et al., "Monocarboxylic Acid Production by Lactococci and Lactobacilli," International Dairy Journal, 2004, 14 (3), 237-246 (Abstract, 1 page).

A. Kieronczyk et al., "The Nature of Aroma Compounds Produced in a Cheese Model by Glutamate Dehydrogenase Positive *Lactobacillus* INF15D Depends on its Relative Aminotransferase Activities Towards the Different Amino Acids," International Dairy Journal, 2004, 14 (3), 227-235 (Abstract, 1 page).

B. A. Smit et al., "Chemical Conversion of ALPHA-keto Acids in Relation to Flavor Formation in Fermented Foods," Journal of Agricultural and Food Chemistry, 2004, 52 (5), 1263-1268 (Abstract, 1 page).

M. G. Casey et al., "Effect of ALPHA-keto Acids on the Development of Flavour in Swiss Gruyere-type Cheese," Lebensmittel-Wissenschaft und-Technologie, 2004, 37 (2), 269-273 (Abstract, 1 page).

A. G. Williams et al., "Enzymes Involved in Flavour Formation by Bacteria Isolated from the Smear Population of Surface-Ripened Cheese," International Journal of Dairy Technology, 2004, 57 (1), 7-13 (Abstract, 1 page).

L. Rijnen et al., "Lactococcal Aminotransferases AraT and BcaT are Key Enzymes for the Formation of Aroma Compounds from Amino Acids in Cheese," International Dairy Journal, 2003, 13 (10), 805-812 (Abstract, 1 page).

C. Martinez-Cuesta et al., "Lacticin 3147 Favours Isoleucine Transamination by *Lactococcus lactis* IFPL359 in a Cheese-Model System," Biotechnology Letters, 2003, 25 (8), 599-602 (Abstract, 1 page).

M. T. Froehlich-Wyder et al., "Keto Acids and Cheese Aroma," AgrarForschung, 2003, 10 (1), 40-42 (Abstract, 1 page).

A. Kieronczyk et al., "Cooperation Between *Lactococcus lactis* and Nonstarter Lactobacilli in the Formation of Cheese Aroma from Amino Acids," Applied and Environmental Microbiology, 2003, 69 (2), 734-739 (Abstract, 1 page).

F. Tavaria et al., "Amino Acid Catabolism and Generation of Volatiles by Lactic Acid Bacteria," Journal of Dairy Science, 2002, 85 (10), 2462-2470 (Abstract, 1 page).

A. G. Williams et al., "Factors Affecting the Activity of Enzymes Involved in Peptide and Amino Acid Catabolism in Non-Starter Lactic Acid Bacteria Isolated from Cheddar Cheese," International Dairy Journal, 2002, 12 (10), 841-852, (Abstract, 1 page).

A. Thierry et al., "Conversion of L-leucine to isovaleric acid by *Propionibacterium freudenreichii* TL134 and ITGP23," Applied and Environmental Microbiology, 2002, 68 (2), 608-615 (Abstract, 1 page).

F. Amarita et al., "Formation of Methional by *Lactococcus lactis* IFPL730 Under Cheese Model Conditions," European Food Research and Technology, 2002, 214 (1), 58-62 (Abstract, 1 page).

A. Thierry and M. B. Maillard, "Production of Cheese Flavour Compounds Derived from Amino Acid Catabolism by *Propionibacterium freudenreichii*," Lait, 2002, 82 (1), 17-32 (Abstract, 1 page).

S. Ur-Rehman and P. F. Fox, "Effect of Added ALPHA-Ketoglutaric Acid, Pyruvic Acid or Pyridoxal Phosphate on Proteolysis and Quality of Cheddar Cheese," Food Chemistry, 2002, 76 (1), 21-26 (Abstract, 1 page).

H. E. Spinnler et al., "Production of Sulfur Compounds by Several Yeasts of Technological Interest for Cheese Ripening," International Dairy Journal, 2001, 11 (4-7), 245-252 (Abstract, 1 page).

J. M. Banks et al., "Enhancement of Amino Acid Catabolism in Cheddar Cheese Using ALPHA-Ketoglutarate: Amino Acid Degradation in Relation to Volatile Compounds and Aroma Character", International Dairy Journal, 2001, 11 (4-7), 235-243 (Abstract, 1 page).

B. V. Hansen et al., "Transamination of Branched-Chain Amino Acids by a Cheese Related *Lactobacillus paracasei* Strain," International Dairy Journal, 2001, 11 (4-7), 225-233 (Abstract, 1 page).

A. Kieronczyk et al., "Metabolism of Amino Acids by Resting Cells of Non-Starter Lactobacilli in Relation to Flavour Development in Cheese," International Dairy Journal, 2001, 11 (4-7), 217-224 (Abstract, 1 page).

M. Yvon and L. Rijnen, "Cheese Flavour Formation by Amino Acid Catabolism," International Dairy Journal, 2001, 11 (4-7), 185-201 (Abstract, 1 page).

N. Klein et al, "Conversion of Amino Acids into Aroma Compounds by Cell-Free Extracts of *Lactobacillus helveticus*," Journal of Applied Microbiology, 2001, 91 (3), 404-411 (Abstract, 1 page).

M. Ummadi and B. C. Weimer, "Tryptophan Catabolism in *Brevibacterium linens* as a Potential Cheese Flavor Adjunct," Journal of Dairy Science, 2001, 84 (8), 1773-1782 (Abstract, 1 page).

A. C. Curtin et al., "Amino Acid Catabolism in Cheese-Related Bacteria: Selection and Study of the Effects of pH, Temperature and NaCl by Quadratic Response Surface Methodology," Journal of Applied Microbiology, 2001, 91 (2), 312-321 (Abstract, 1 page).

A. C. Curtin and P. L. H. McSweeney, "Catabolism of Amino Acids in Cheese During Ripening," Cheese: Chemistry, Physics and Microbiology, vol. 1: General Aspects, 3rd Edition, 2004, 435-454, Elsevier, Amsterdam (Abstract, 1 page).

J. M. Banks and A. G. Williams, "The Role of the Nonstarter Lactic Acid Bacteria in Cheddar Cheese Ripening," International Journal of Dairy Technology, May-Aug. 2004, 57 (2-3), 145-152 (Abstract, 1 page).

A. G. Williams et al., "The Effect of Alpha-Ketoglutaric Acid on Amino Acid Utilization by Nonstarter *Lactobacillus* spp. Isolated from Cheddar Cheese," Letters in Applied Microbiology, 2004, 38 (4), 289-295 (Abstract, 1 page).

B. Ganesan et al., "Monocarboxylic Acid Production by Lactococci and Lactobacilli ," International Dairy Journal, Mar. 2004, 14 (3), 237-246 (Abstract, 1 page).

W. J. M. Engels et al., "Flavour Formation in Cheese," Dairy Processing: Improving Quality, 2003, 492-511, Woodhead Publishing Ltd., Cambridge (Abstract, 1 page).

J. M. Banks and A. G. Williams, "Uninvited Friends: Non-Starter Lactic Acid Bacteria in Cheese Ripening," Yearbook, 2003, 22-28, Hannah Research Institute, Ayr, United Kingdom (Abstract, 1 page).

M. M. Churchill et al., "Proteolysis at the Surface of Tilsit Cheese," Milchwissenschaft, 2003, 58 (5-6), 293-296 (Abstract, 1 page).

M. Yvon, "Changing Cheese," Dairy Industries International, Dec. 2002, 67 (12), 25 (Abstract, 1 page).

M. De Angelis et al., "*Lactobacillus reuteri* DSM 20016: Purification and Characterization of a Cystathionine Gamma-Lyase and Use as Adjunct Starter in Cheesemaking," Journal of Dairy Research, May 2002, 69 (2), 255-267 (Abstract, 1 page).

A. C. Curtin et al., "Amino Acid Catabolism in Cheese-Related Bacteria: Selection and Study of the Effects of pH, Temperature and Salt by Quadratic Response Surface Methodology", Journal of Applied Microbiology, Aug. 2001, 91 (2), 312-321 (Abstract, 1 page).

A. G. Williams et al., "Catabolism of Amino Acids by Lactic Acid Bacteria Isolated from Cheddar Cheese," International Dairy Journal, 2001, 11 (4-7), 203-215 (Abstract, 1 page).

J. Banks, "Transaminase Activity in the Enhancement of Cheddar Aroma," Yearbook, 2001, 16, Hanna Research Institute, Ayr, United Kingdom (Abstract, 1 page).

P. Fernandez De Palencia et al., "Enhancement of 2-Methylbutanal Formation in Cheese by Using a Fluorescently Tagged Lacticin 3147 Producing *Lactococcus lactis* Strain," International Journal of Food Microbiology, Jun. 15, 2004, 93 (3), 335-347 (Abstract, 2 pages).

C. Tanous et al., "Glutamate Dehydrogenase Activity: A Major Criterion for the Selection of Flavour-Producing Lactic Acid Bacteria Strains," Antonie van Leeuwenhoek, Aug. 2002, 82 (1-2), 271-278 (Abstract, 1 page).

F. Amarita et al., "*Lactobacillus casei* and *Lactobacillus plantarum* Initiate Catabolism of Methionine by Transamination," Journal of Applied Microbiology, Jun. 2001, 90 (6), 971-978 (Abstract, 1 page).

S. Gummalla, "Aromatic Amino Acid Catabolism by *Lactobacillus* Spp.: Biochemistry and Contribution to Cheese Flavor Development," Utah State University, Department of Nutrition and Food Sciences, 2002 (Dissertation Abstract, 1 page).

* cited by examiner

CHEESE FLAVOR COMPOSITION AND PROCESS FOR MAKING SAME

FIELD OF THE INVENTION

The present invention relates to cheese flavor compositions, and particularly cultured cheese concentrates and a process for making same.

BACKGROUND OF THE INVENTION

The art of making cheese is complex and has evolved very little over time. The process still begins with milk mainly from cows, sheep or goats. About ten pounds of milk is required to produce a single pound of cheese. The milk is often, but not always, pasteurized to kill unwanted bacteria. Next, a starter culture of desirable bacteria is added to the milk. The starter culture can be, for example, *streptococci* or *lactobacilli* bacteria. The particular strain of bacteria and amount used help in flavor development. The milk is then allowed to ferment and the microorganisms break down lactose converting it into lactic acid, citric acid, and other metabolites.

After fermentation is complete, enzymes are added which begin breaking down casein, a soluble protein in milk. Rennet is one such enzyme that is obtained from the lining of the fourth stomach of claves. In addition to breaking down casein, rennet helps coagulate the milk solids into curds floating in a solution of milk sugar, minerals and other water-soluble proteins also known as whey.

The curds and whey are heated and stirred, and the whey is drained off. The curds are transferred into a mold, pressed into blocks and left to age. Aging times vary from, for example, a few days to several months and sometimes years. In the case of cheddar cheese aging for about sixty days provides a mild to medium flavor while extra sharp flavor requires about fifteen months. Microbial and chemical reactions continue to occur in the cheese as it ages.

During the aging process many compounds are produced which contribute to flavor generation. In fact, it has been estimated that about four hundred different compounds contribute to the flavor of cheddar cheese. The main classes of compounds thought to contribute to flavor generation in cheese include amino acids, peptides, carbonyl compounds, fatty acids and sulfur compounds. Several volatile compounds including fatty acids, esters, aldehydes, alcohols, ketones, and sulfur compounds are included in lists describing the aroma of various cheeses. Production of several of these aroma and flavor compounds has been attributed to multiple enzymatic and chemical reactions that take place in a sequential manner in cheese as it ages.

One particular series of reactions that occurs involves proteins that are broken down into their component amino acids. These amino acids are then converted to their corresponding $\alpha$-keto acids. The $\alpha$-keto acids are metabolized even further providing compounds that add particular flavor notes to the cheese. Amino acid catabolism has been identified as a rate-limiting step in the development of cheese flavors.

As consumer demand continues to grow for high quality and flavorful cheese, it is necessary to decrease the time it takes for flavor to fully develop. One approach has been to make a cultured cheese concentrate ("CCC") having more intense cheese flavor, and then use it as a cheese flavoring agent in another bulk material. CCC's have been manufactured that attain full cheese flavor development within a number of days instead of months. These CCC's are added to other bulk foods, such as process cheeses or snack foods, to impart or intensify a cheese flavor. Methods for the manufacture of such cheese-flavored concentrates have been described, such as in U.S. Pat. No. 4,708,876. Typically the process involves a fat and protein containing substrate that is cultured with a lactic culture followed by addition of various cultures, proteases, peptidases, and lipases. U.S. Pat. No. 4,708,876 describes cheese flavored concentrates that can be obtained from a starting material containing an interesterified fat with butyric acid as an essential constituent fatty acid, instead of cheese curds, or without formation of whey byproduct. U.S. Pat. No. 6,214,586 describes use of live cultures having high levels of proteolytic enzymes and peptidolytic enzymes to debitter enzymatic modified cultures.

Although these prior processes may produce an accelerated development, or an enhancement, of cheese flavor, they do not produce enhancements that target specific cheese flavor components. More recently a technology has been developed to produce a natural biogenerated cheese flavoring system that can be used to prepare different cheese products/derivatives, targeted at various cheese flavor profiles using a modular approach to flavor creation, which is described in, for example, U.S. Pat. No. 6,406,724. The cheese flavoring system described in this patent is derived from different components, wherein the individual components are combined in different ratios to provide specific flavor profiles in the cultured cheese concentrate products.

Despite the developments described in the above publications, a need still exists for alternative routes for making cheese flavoring systems, especially with a more diversified range of possible flavors. The present invention provides a cultured cheese concentrate and method for its manufacture that meets these and other desirable needs as well as provides other benefits.

SUMMARY OF THE INVENTION

The present invention provides a cheese flavor composition and a process for preparing a cheese flavor composition comprising the steps of (a) contacting a protein containing dairy product with a lactic acid culture to form a reaction mixture at a temperature of about 25 to about 45° C. for about 8 to about 72 hours to provide peptides and free amino acids and, (b) contacting the peptides and free amino acids within the reaction mixture with amino acid oxidase to deaminated the peptides and free amino acids to provide $\alpha$-keto acids, wherein the $\alpha$-keto acids are further metabolized within the reaction mixture to provide flavor compounds. The present invention also provides a food product comprising the cheese flavor composition.

DETAILED DESCRIPTION OF THE INVENTION

In a first embodiment, the present invention provides a process for preparing a cheese flavor composition comprising the steps of (a) contacting a protein containing dairy product with a lactic acid culture to form a reaction mixture at a temperature of about 25 to about 45° C. for about 8 to about 72 hours to provide peptides and free amino acids and, (b) contacting the peptides and free amino acids within the reaction mixture with amino acid oxidase to deaminated the peptides and free amino acids to provide $\alpha$-keto acids, wherein the $\alpha$-keto acids are further metabolized within the reaction mixture to provide flavor compounds.

The protein containing dairy product is selected from a milk concentrate, milk, a whey concentrate, a whey substrate, or any combination thereof.

The lactic acid culture is selected from the group consisting of *Lactobacillus bulgaricus, Lactobacillus lactis, Lactobacillus helveticus, Lactobacillus delbrueckii* ss. *lactis, Streptococcus thermophilus Lactococcus lactis* subsp. *lactis, Lactococcus lactis* subsp. *cremoris, Lactococcus lactis* subsp. *lactis* biovar *diacetylactis, Leuconostoc lactis, Leuconostoc mesenteroides* subsp. *cremoris, Pediococcus pentosaceus,* and *Lactobacillus casei*, and mixtures thereof.

In a second embodiment, step (a) of the aforementioned process further comprises contacting a protein containing dairy product with at least one protease enzyme.

In a third embodiment, step (a) of the aforementioned processes further comprises contacting a protein containing dairy product with at least one peptidase enzyme.

In a fourth embodiment, any of the aforementioned processes further comprise the step of deactivating the enzymes within the reaction mixture after step (b) by heating the reaction mixture to a temperature from about 60° C. to about 80° C. for a time period from about 15 seconds to about 1 hour. In one embodiment, the step of deactivating the enzymes within the reaction mixture occurs by heating the reaction mixture to a temperature of about 74° C. for about 16 seconds. In another embodiment, the step of deactivating the enzymes within the reaction mixture occurs by heating the reaction mixture to a temperature of about 63.5° C. for about 30 minutes.

In a fifth embodiment, step (a) of any of the aforementioned processes further comprise adding at least one free amino acid to the reaction mixture. The amino acids used can be, for example, but not limited thereto, unbranched, branched or aromatic. In one embodiment, isoleucine, leucine, valine, phenylalanine, tryptophan, methione either individually or any combination thereof may be added to the reaction mixture to enhance a desired flavor note or notes.

In a sixth embodiment, step (b) of any of the aforementioned processes further comprises the step of oxygenating the reaction mixture.

In a seventh embodiment, step (b) of any of the aforementioned processes further comprises adding catalase enzyme to the reaction mixture.

In an eighth embodiment, step (b) of any of the aforementioned processes further comprises adding catalase enzyme and hydrogen peroxide to the reaction mixture.

In a ninth embodiment, step (b) of any of the aforementioned processes further comprises adding aminotransferase to the reaction mixture.

In a tenth embodiment, step (b) of any of the aforementioned processes further comprises adding an amino group acceptor to the reaction mixture.

The term "a protein containing dairy product" is defined as a dairy product comprising a combination or mixture of an aqueous protein source and a fat source. The dairy product can be a milk concentrate, a milk substrate, a whey concentrate, a whey substrate, or combinations of these dairy substances with each other, and in combination with a supplemental protein or fat source. The dairy product generally will be in the form of an aqueous protein and fat source combination. It can be in emulsion form.

The dairy products, such as a fluid milk concentrate, useful as the starting material generally have total solids contents of about 30 to about 50 percent, protein contents of about 10 to about 19 percent, fat contents of about 15 to about 30 percent, and lactose contents of about 0.1 to about 10 percent. Preferably, they have total solids contents of about 35 to about 47 percent, protein contents of about 12 to about 17 percent, fat contents of about 18 to about 25 percent, and lactose contents of about 0.5 to about 5 percent. The moisture levels of the dairy product are generally from about 50 to about 70 percent, preferably from about 53 to about 65 percent.

The protein source can be a dried protein or concentrated material and is preferably a dairy ingredient, such as milk protein concentrate, fractionated milk protein, concentrated milk fat, whey protein concentrate, dried whey, non-fat dry milk, or mixtures thereof. Other protein sources, such as hydrolysed whey protein, hydrolysed casein, vegetable, yeast extract (e.g., Umamex II, Hy-Yep 77, Yep L), cereal, legume protein, soy protein, corn protein, wheat protein, and/or rice protein can be used in part or as the sole protein source. The fat source is preferably a milk fat such as anhydrous milk fat, butter, cream, or mixtures thereof. Other non-dairy fat sources, such as vegetable oil, can be used in part or as the sole fat source. The pH of the dairy concentrate or substrate is generally in the range of about 6 to about 7 and preferably in the range of about 6.5 to about 6.7. In general, at least one of the protein and fat sources will include a dairy ingredient in the practice of this invention to provide a highly useful starting material from which various flavors which are normally or otherwise associated with cheese products can be developed.

A dried protein source, if used, is reconstituted with water. The water is used at a level sufficient to provide total moisture of from about 50 to about 70 percent, preferably from about 53 to about 65 percent in the substrate. The reconstituted protein source is combined with the fat source to provide the substrate. If necessary, the pH of the substrate can be lowered to the proper range (i.e., about 4.6 to about 6 and preferably about 4.8 to about 5.6) by the addition of an edible acid or by use of a lactic acid producing microorganism. Suitable edible acids are non-toxic, inorganic or organic acids, which include hydrochloric acid, acetic acid, maleic acid, tartaric acid, citric acid, phosphoric acid, lactic acid, and mixtures thereof. In preparing the milk concentrate, a homogenization device can be used to reduce the fat droplet particle size and insure homogeneity of the substrate.

In one embodiment, the dairy product used as the starting material is an aqueous milk-derived concentrate or substrate that is a fluid milk concentrate prepared by ultrafiltration (alone or even more preferably combined with diafiltration) or a reconstituted milk substrate prepared from a mixture of an ultrafiltered (UF) or ultrafiltered/diafiltered (UF/DF) milk powder and milk fat. The starting material can be an UF/DF milk having the following characteristics:

|  | Typical (%) | Preferred (%) |
|---|---|---|
| Total Solids | 30-50 | 35-47 |
| Moisture | 50-70 | 53-65 |
| Fat | 15-30 | 18-25 |
| Protein | 10-19 | 12-17 |
| Lactose | 0.1-10 | 0.5-5 |
| Salt | 1-3 | 1-2 |
| Ash | 0.5-25 | 1-2 |
| pH | 6-7 | 6.5-6.7 |

These milk concentrates can be used as is or in combination with a supplemental fat source to provide the substrate (starting material). Preferred dairy products useful as starting materials for the methods of the present invention can be prepared from concentrated whole or skim milk with, if desired, added cream or anhydrous milk fat (AMF). The cream or AMF generally is added in an amount of 0 to about 20 percent, preferably about 2 to about 15 percent, by weight of the mixture. In one embodiment for making the dairy product, skim milk is subjected to conventional ultrafiltration/diafiltration techniques to produce an about 3× to about 8× (preferably about 5×) milk concentrate product. Cream or anhydrous milk fat or a combination thereof is mixed with the milk concentrate. In one exemplary non-limiting embodiment, the resulting mixture is homogenized, and pasteurized under high temperature short time (HTST) conditions, such as at about 76° C. for about 16 seconds in a heat exchanger, and then it is cooled to about 21 to about 27° C. This additional treatment aids in reducing the fat droplet size and insures homogeneity of the substrate prior to fermentation. The resulting dairy product can be used as the starting material that is subjected to fermentation to prepare the specific flavoring components of the present invention. Preferably, about 1 to about 2 percent salt is added to the dairy product prior to treatment with the various enzymes/cultures/additives to produce the specific flavoring components. The pasteurized dairy product is a relatively viscous liquid, preferably containing about 30 to about 50 percent solids.

The term "a lactic acid culture" is defined as a culture which converts lactose to lactic acid and reduces the pH. In general the inoculated substrate is fermented in the presence of the lactic culture at a temperature and for a time sufficient to provide homofermentative catabolism of lactose to lactate to a desired level. The endpoint generally may correspond with a reduction in the pH of the fermenting mixture to a given value. The fermentation periods of time, temperatures, and endpoint pH parameters can vary depending on the type of cheese flavor being prepared. The lactic acid culture used include those commonly used in lactic acid fermentation including thermophillic and/or mesophillic bacteria used for that purpose.

The lactic acid culture used in the present invention include those commonly used in lactic acid fermentation associated with natural cheese production including thermophillic and/or mesophillic bacteria suitable for that purpose. When thermophillic cultures are used, a rod culture may be used comprising *Lactobacillae* and/or a coccus culture comprising *Streptococcus thermophilus*. The *Lactobacillae* may be selected, for example, from *Lactobacillus bulgaricus, Lactobacillus lactis, Lactobacillus Helveticus, Lactobacillus delbrueckii* ss. *bulgaricus, lactobacillus acidophilus, Enteroccus faecium*, or mixtures thereof. In one preferred aspect, a *Lactobacillae* rod culture is generally added to the fermentation mixture at a level of about 0.01 to about 1 percent, particularly about 0.05 to about 0.5 percent. The *Streptococcus thermophilus* culture may be generally added at a level of about 0.01 to about 1 percent, particularly about 0.05 to about 0.5 percent. Commercial sources of thermophillic *Lactobacillae* are available from, for example, from CHR. Hansen A/S, Hørsholm, Denmark. Commercial sources of thermophillic *Streptococcus thermophilus* bacteria are also available from, for example, from CHR. Hansen A/S, Hørsholm, Denmark (including, for example, TH-3 and TH-4). Preferably, the cultures are direct vat set (DVS) cultures, although in-house bulk starters also may be used. Mesophillic lactococcal fermentation also can be used to generate significant amounts of lactic acid at a pH above 5.0 and at 30° C. As generally known mesophilic culture strains of lactic acid bacteria generally have an optimum growth temperature at about 30° C., and thermophillic culture strains of lactic acid bacteria generally have optimum growth temperatures in the range of about 40° C. to about 45° C. Examples of the thermophilic bacteria include the above-identified rod and coccus cultures. Examples of the mesophilic bacteria include, for example, *Lactococcus lactis* subsp. *lactis, Lactococcus lactis* subsp. *cremoris, Lactococcus lactis* subsp. *lactis* biovar. *diacetylactis, Leuconostoc lactis, Leuconostoc mesenteroides* subsp. *cremoris, Pediococcus pentosaceus*, and *Lactobacillus casei* subsp. *casei*. Commercial sources of mesophillic *Lactococcus lactis* bacteria include, for example, R-603, R-604, and R-607 from CHR. Hansen A/S, Hørsholm, Denmark.

Suitable lactic acid culture enzymes of the above types can be produced from various microorganisms or extracted from plant or animal tissues. DVS starter cultures and/or bulk starter cultures may be used. The DVS cultures may be commercially obtained in frozen concentrate form, liquid form, or as freeze-dried or lyophilised cultures in powder form.

The term "amino acid oxidase" is defined as an enzyme which oxidatively deaminates amino acids to the corresponding α-keto- acids. The enzyme with amino oxidase activity can be a purified enzyme material from either microorganism, animals or plants; or cells of a microbe which produces amino oxidase activity; or tissue material of a plant or animal that produces the enzyme or nucleic acids, vectors and microorganisms expressing such amino acid oxidases. D- and/or L-forms of the enzyme may be used in the practice of the present invention. D- or L-amino acid oxidase generally will selectively transform D- or L-amino acids, respectively, present in a reaction mixture. The amino acids that can be transformed by amino acid oxidase to their corresponding α-keto acids are not particularly limited, but preferably comprises amino acids which serve as precursors and intermediates for food and aroma flavor compounds and metabolites derived directly or indirectly from degradation of the α-keto acid intermediates generated in the reaction mixture during stage two of the processing. For example, and not by way of limitation, such amino acids may include alanine, phenylalanine, glutamine, valine, isoleucine, leucine, lysine, proline, glycine, tryptophane, threonine, and the like. Sulfur-containing free amino acids, i.e., tri-peptides containing sulfur-containing amino acids, and protein hydrolyslates containing sulfur-containing amino acids, may be utilized. Suitable food protein hydrolysates are available, for example, from Quest International (Hoffman Estates, Ill.) under tradenames N-Z-Amine, N-Z-Case, Hy-Case, and Pepticase, as well as from other suppliers. Preferably, the sulfur-containing amino acids include L-methionine, L-glutathione, and L-cysteine, or a mixture thereof. Preferably, a combination of D-amino acid oxidase and L-amino oxide oxidase are added for purposes of conducting the second stage of processing according to the present invention. Commercial sources of L- and D-amino acid oxidase are available (e.g., Sigma Chemicals, Saint Louis, Mo.). The amino acid oxidase is generally used at levels of from about 0.001 to about 4 percent, preferably at levels of from 0.01 to about 2 percent.

When the target flavor is reached in the second stage of processing, the enzymes (proteases, peptidases, amino acid oxidases, and the like) are deactivated by heating the reaction mixture to a temperature and holding for a sufficient period of time to insure complete enzyme deactivation (e.g., by heating to about 70 to about 100° C. and holding for about 5 to about 60 minutes or other suitable thermal cycles for this purpose).

The term "protease enzyme" and "peptidase enzyme" are defined as enzymes which interact and/or react with the dairy substrate to generate free amino acids in the initial (fermentation) stage. As indicated, the protease and peptidase enzymes are multi-functional in the context of embodiments of this invention. The proteases and peptidase may be added sequentially or all during the fermentation stage of processing. They are not deactivated until after completion of the second stage of processing. The multi-functional enzymes can be produced from various microorganisms or extracted from plant or animal tissues. The various enzymes of the enzyme system are available commercially as dry powders or in liquid form.

The proteases are enzymes that can be derived from fungal, plant, or animal sources, as is well-known in the art. Examples of suitable proteases include Enzeco Neutral Bacterial Protease 2x, available from Enzyme Development Corp., and Promod 215 available from Biocatalysts. The powdered proteases are generally used at levels of from about 0.01 to about 1 percent, preferably at levels of from 0.1 to about 0.4 percent.

An enzyme with peptidase activity, preferably aminopeptidase activity, is also used in the system. The enzyme with peptidase activity can be a purified enzyme material or can be cells of a microbe which produces peptidase activity, such as *Lactobacillus helveticus*. The cultured cells can be spray dried, freeze dried, frozen, or freshly cultured cells and can be non-growing or capable of propagation within the substrate. Spray dried *Lactobacillus helveticus* may be used at a level from about 0.01 to about 3 percent, preferably at levels of from 0.05 to about 0.5 percent.

During the first step, also known as the "fermentation stage", a dairy product such as, for example but not limited thereto, a concentrated UF/DF milk concentrate, is inoculated with lactic acid bacteria. This inoculation mix is supplemented with proteases and peptidases to assist in the generation of free amino acids. Alternatively, hydrolyzed dairy proteins (e.g., NZ Amine available from Fonterra; Peptigen and Lacprodan available from Arla Foods Ingredients; Barpro available from Glanbia Nutritionals; Enzcase and Hycase available from Kerry Bioscience) could be used as the starting substrate or a lactose (sugar) rich medium is supplemented with hydrolyzed protein and yeast extract. Proteases and peptidases are added with the lactic acid culture. The resulting mixture is fermented as part of a first stage of processing. The mixture is fermented at 30° C. for 12-18 hours. The peptidase enzyme preparation, in concert with the protease enzymes, creates a high concentration of free amino acids and small peptides in the reaction mixture which contribute to development of cheese flavor. Consequently, a resulting hydrolyzed protein mix obtained from this initial process stage contains free amino acids. The inoculated substrate may be fermented in a single-stage or multi-stage fermentation process as part of Stage 1 processing. The intermediate hydrolyzed protein mix may be further processed immediately, or temporarily stored under chilled conditions (e.g., about 4° C.) before proceeding to subsequent processing described below. The fermented reaction mixture optionally could be subjected to a homogenization step prior to the further processing.

In the second stage of the process, amino acid oxidase is added to generate α-keto acid intermediates in-situ in the cultured cheese matrix containing free amino acids and the cheese microorganisms. The cheese microorganisms are not deactivated prior to second stage processing. The α-keto acids generated in-situ (and/or those extraneously added as described below) are in turn converted in-situ to perceptible cheese flavor and aroma metabolites in the cheese matrix. The intermediate reaction mixture containing the fermented dairy product compounds, free amino acids, amino acid oxidase, proteolytic enzymes, and peptidolytic enzymes is aerated during second stage processing sufficient to prevent anaerobic conditions. Aeration can be effected chemically or mechanically. Catalase can be introduced to the reaction mixture which liberates oxygen from hydrogen peroxide by-product generated via the conversion of amino acids to α-keto acids. Air, oxygen, or other oxygen-containing gas also may be introduced into the reaction mixture, such as via a diffusion plate or an in-line sparger.

When a desired cheese flavor profile has been sufficiently developed, the reaction mixture is heated to a temperature and for a time period sufficient to deactivate the enzymes. Aeration is discontinued during the deactivation treatment. The resulting cheese flavored composition product may be used immediately or stably stored under chilled conditions until used later as a cheese flavoring additive in food product manufacture or another application.

Before and/or after enzyme deactivation, the flavor and aroma level of the cultured milk concentrate can be judged organoleptically and/or can be estimated through analytical measurements, such as pH, titratable acidity, and concentration of free fatty acids, amino acids, or other metabolites known to be associated with a given cheese flavor profile. Sensory tests used may include, for example, taste and/or smell.

This unique multi-step enzymatic pathway is useful for developing flavor and aroma compounds from α-keto acids in freshly cultured cheese products, which enhance or amplify the overall cheesy perception of the cultured product. The use of amino acid oxidase, and proteolytic and peptidolytic enzymes, in the cultured cheese matrix can aid in the development of flavor and aroma compounds for the production of cheese flavor concentrates in several ways in the practice of the present invention, such as, for example, by aiding in the enhancement of overall cheesy perception when used in lactic acid bacteria fermentations which are high in amino acids; and by targeting the metabolism of specific amino acids in a particular fermentation, specific flavors can be developed in a particular block depending on the amino acid being targeted including blocks with "nutty" type of flavor profile. Also, flavor and aroma compounds can be generated in the production of cheese flavor concentrates within a relatively short period of time without need for an aging step. This unique approach also offers a cost advantaged alternative to the use of aminotransferases, and is also more suitable for a cultured cheese concentrate ("CCC") application where the fermentation can be done under aerobic conditions.

In an alternative embodiment, free amino acids can be extraneously introduced into the reaction system to provide a primary source of free amino acids, and/or supplement or diversify the free amino acid content separately developed in-situ during the initial (fermentation) stage of the process. The amino acids generated in-situ and added extraneously are made available for the above-indicated second stage processing involving α-keto acid generation via oxidative deamination of amino acids catalyzed by amino acid oxidase, and their subsequent degradation to flavor metabolites in the co-presence of the proteases and peptidases. Extraneous addition of amino acids also can be used to target the metabolism of select amino acids in a particular fermentation, whereby specific flavors can be developed in a particular block depending on the amino acid being targeted.

Flavor blocks which may be produced with processes of the present invention include, for example, a nutty flavor profile component, a malty flavor profile component, and a chocolate flavor profile component. These flavor blocks can be combined in different ratios to generate desired flavors of various cheeses.

Other supplemental enzyme synergies optionally may be incorporated during the second stage of processing to assist the above-described second stage enzymatic reactions. For instance, as indicated, catalase optionally may be added during the above-indicated second stage of processing in an amount sufficient to regenerate oxygen from $H_2O_2$ by-product.

Aminotransferase also optionally may be added during the above-indicated second stage of processing to further promote interconversion of amino acids and keto acids to generate a range of keto acids using keto acids generated by amino acid oxidase as amino group acceptors. However, the optional additional use of aminotransferase generally requires the presence of an amino group acceptor, such as α-keto glutatarate, which is limiting in the cheese matrix and needs to be supplemented to enhance transamination.

The process can be, and preferably is, conducted in a single vessel without transfer to additional vessels for sequential steps. The vessel is preferentially provided with mixing equipment to insure good contact between the lactic acid culture, enzymes, and the substrate materials and to maintain the solids in suspension. A scraped surface mixing tank may be used. A recirculation and homogenization device may be employed to prevent segregation of a fat phase from aqueous materials and to aid in maintaining the solids in suspension. Water may be added during the fermentation stage to maintain desired moisture content and acidic or basic materials may be added to adjust the pH. Fermentation may be carried out with recirculation using a shear pump to prevent the reaction mixture from becoming anaerobic and to provide good mixing.

For the fermentation stage, common cheese concentrate additives and processing additives also may be optionally included with the milk concentrate substrate in minor amounts sufficient for their intended respective functions, such as salt, thickeners (e.g., xanthan gum), emulsifiers, supplemental starter media for cheese cultures (e.g., yeast hydrolysate), antifoam agents (e.g., Hodag FD-62 K which is a 10% active silicone emulsion antifoam, Lambent Technologies Corp, Gurnee, Ill.), and so forth. Lipase (sometimes referred to as an esterase) is an enzyme that is well known in the art. Lipases are typically derived from the gullet tissues of young animals (calves, kids, or lambs), from the pancreas of adult animals, or from microbial sources. Various commercial preparations derived from gullet tissue are available from SKW BioIndustries, Marschall Laboratory, or other such companies under various trade names. The enzyme can be manufactured by grinding edible gullet with salt and non-fat dry milk, drying the mixture, and grinding again. Microbial sources of lipase are, for example, the molds *Candida cylindracea* Type VII, *Aspergilus oryzae, A. niger; Pencillium roqueforti, P. glaucum,* and *Rhizopus oryzae.* A mixture of lipase and protease enzymes also may be commercially obtained in preblended form, such as R2 enzyme from SKW BioIndustries. A suitable fungal lipase is commercially available from Biocatalysis under the tradename Lipomod 187. A powdered lipase (preferably a fungal lipase) generally may be used at a level of about 0.05 to about 0.4 percent. As another option for Stage 1 processing, the pH of the substrate can be lowered prior to fermentation to a suitable range for flavor development by the addition of free lactic acid alone or in combination with other edible acids (e.g., HCl, acetic acid, maleic acid, tartaric acid, citric acid, phosphoric acid, and mixtures thereof), and then the fermentation is carried out.

Other specific enzymes, cultures, adjuncts, and other additives may be provided for Stage 1 processing to encourage preparation of a target flavor block, such blocks corresponding to a "sulfury-cheddar" component, a "cheesy" component, or a "creamy-buttery" component, such as described in U.S. Pat. Nos. 6,406,724 and 6,562,383, which are incorporated herein by reference.

As indicated above, catalase optionally may be added during the second stage of processing to promote release of oxygen from hydrogen peroxide by-product of the transformation of the amino acids to α-keto acids. Also indicated above, aminotransferase or cells or cell-free extracts of organism producing high levels of aminotransferase also optionally may be added during the above-indicated second stage of processing to further promote interconversion of amino acids and keto acids to generate a range of keto acids using keto acids generated by amino acid oxidase as amino group acceptors. However, as indicated, the optional additional use of aminotransferase generally requires the presence of an amino group acceptor, such as α-keto glutatarate.

The cultured cheese concentrate product obtained from the process described herein above generally has a liquid or pasty consistency. The paste form is characterized as a viscous mass having spreadable consistency. The liquid or paste form of the cultured cheese concentrate can, if desired, be spray dried to form a powdered form thereof. The liquid/paste or powder forms thereof are ready-to-use cheese flavoring materials, which can be used in food products for flavor addition, flavor enhancement, and as a substitute for natural cheese ingredients thereof. Cheese coagulants, such as rennet or alkaline earth salt solidifying agents commonly used in cheese manufacture, are not required. There is no whey drainage step used or needed after fermentation. In addition, no cheese blocks need to be formed or cured/aged for lengthy periods of time to develop a useful cheese flavor profile in the CCC product obtained. The cultured cheese concentrate does not need to be ground, sliced, cut, cleaned, or the like, before being used a cheese flavoring additive.

The cheese flavor composition products obtained by the processes embodied by this invention have many potential uses, especially in food products. For instance, the cultured cheese concentrate may be incorporated into bulk foods, such as process cheeses, cheese spreads, natural cheeses, cheese analogs, cottage cheeses, cream cheeses, cheese powders, seasonings, cheese sauces, cheese flavorings for snacks, enhancers, dressings, snack foods (e.g., snack chips, snack food cheese fillings), and the like, to impart or intensify a cheese flavor in them. The cultured cheese concentrate can be incorporated into a cheese base, a food formulation, and/or may be filled into or applied onto food products, in paste or powdered forms thereof. It may be used as a substitute for natural cheese ingredients otherwise intended to be used in such food products.

In process cheese and cheese spread manufacture, the cultured cheese concentrate may be used to reduce natural hard cheese requirements without adversely impacting product processing ease, functionality, or the desired product organoleptic attributes. The reduction of natural cheese amounts in particular and dry matter levels of a process cheese or cheese spread formulation achieved by using cultured cheese concentrates herein as a substitute for some portion thereof can lead to significant cost savings. The cultured cheese concentrates also are produced in ready-to-use forms much more rapidly than natural cheeses which require lengthy curing periods. Also, normal handling operations for natural cheeses (e.g., cool bulk storage, cleaning, grinding, and the like) are reduced or eliminated by using the cultured cheese concentrates of this invention as substituted for at least a portion thereof.

The cheese flavor composition also can be used as a cultured cheese concentrate incorporated into a milk substrate or whey substrate from which natural cheese or an analog cheese is produced. For instance, the cultured cheese concentrates can be added as a flavoring agent to a milk substrate used to produce natural cheese, wherein the milk substrate is then treated in generally customary manner to produce the desired flavored "natural" cheese.

As indicated, cheese flavor building blocks also may be prepared using principles of this invention, which can be combined with other blocks in modular fashion to develop a desired flavor profile.

The total amount of cultured cheese concentrate incorporated can be varied to achieve particular flavor combinations or flavor notes depending on the desired flavor characteristics. In this aspect, about 1 to about 10 weight percent of the cultured cheese concentrate is incorporated.

The following examples further illustrate the present invention. Parts and percentages are given by weight unless otherwise indicated. All patents and publications cited herein are hereby incorporated by reference.

EXAMPLES

Control: Generation of Keto Acids Using Amino Acid Oxidase in Buffer Solution. A control experiment was conducted in which the generation of keto acids in a buffer solution was investigated by reaction of select free amino acids and amino acid oxidase enzymes. The buffer solution was free of a dairy substrate and cheese microorganisms. The reaction mixture contained an amino acid solution, amino acid oxidase, and catalase (which reacted with hydrogen peroxide by-product of the reaction). The following amino acids were added as free acid reactants: D-alanine, D-valine, D-glutamic acid, L-isoleucine and D,L-leucine. Each amino acid was added at a concentration of 10 mM in a phosphate buffer (100 mM, pH 8.0), and 8 units/mL each of L- and D-amino acid oxidase (Sigma Chemicals, Saint Louis, Mo.) and 32 mg/mL catalase (Novozymes), were added to a 5 mL reaction volume. The sample was incubated at 37° C. for 2 hours with aeration.

The reaction products were analyzed via micellar electrokinetic capillary electrophoresis to detect the presence and characteristic analytical response of the various α-keto acids products.

Additional comparative experiments were conducted which indicated that the reaction in the control could be carried out in the absence of catalase, under otherwise similar reaction conditions. However, as compared to a separate experiment conducted without catalase, the reaction efficiency was increased when the catalase was included in the control experiment. The oxidation reaction also can be successfully conducted without the presence of $H_2O_2$ but at lower efficiencies; oxygen can also be supplied using air, oxygen-enriched air, or oxygen.

Example 1

Generation of keto acids using amino acid oxidase in dairy substrate. In this experiment amino acid oxidase was evaluated for generation of keto acids in a dairy substrate, particularly 5× milk concentrate. As the dairy substrate, whole milk was subjected to conventional ultrafiltration/diafiltration techniques to produce an approximately 5× milk concentrate product. The dairy substrate was supplemented with separately added free amino acids, as in situ generation of low levels of free amino acids were expected as the milk concentrate was not lactic acid cultured or treated with proteases/peptidases. The types and amounts of amino acids added were identical to those added in the buffer system of the control described above. All other experimental reactant and synthesis conditions were same as in the control experiment.

The biogenerated reaction mixture obtained was analyzed via micellar electrokinetic capillary electrophoresis. The presence of the following α-keto acids were detected in the reaction mixture; α-keto pyruvic acid, α-keto isocaproic acid, α-keto valeric acid, and α-keto isovaleric acid.

Sensory data on flavor impact was gathered by the addition of chemically synthesized α-keto acids of the types identified above (0.1 percent each) to cultured cheese concentrate matrix upon which an increase in cheesy flavor perception was noted via tasting.

These experiments demonstrated that amino acids can be converted to their respective keto acids with amino acid oxidase enzyme in both dairy substrate (5× milk concentrate) and buffer systems.

Example 2

Evaluation of amino acid oxidase in EMFC. The cheese base consisted of dried milk powders, cream, butterfat, salt, lactic acid and water. An enzyme mixture comprising of microbial protease, microbial lipase and peptidase were added (Neutral bacterial protease, Promod 215, Enzobact, Lipomod187. The resulting cheese mix was inoculated with the following cultures; *Lactococcus lactis* spp. *lactis, Lactococcus lactis* spp. *cremoris*, and *Lactococcus helveticus* were added at 0.01% each. α-keto acids were each added at a 0.1% rate, these keto acids comprised of α-keto isocaproate, α-keto glutarate and α-ketoglutarate plus leucine. Each of these keto acids were added to separate batches of cheese in order to evaluate the impact of the keto acids individually. The cheese batches were incubated at 32° C. for 48 hours to a final pH of about 5.2. The cheese samples were heat-treated to inactivate the cultures and enzymes and submitted for flavor analysis via GC-MS and GC-olfactometry.

Example 3

Experiments conducted to investigate the impact of supplementing a-keto glutarate, and a-keto glutarate along with leucine during fermentation in 5× milk. 5× UF DF milk was fermented using a 0.01% innoculum of culture R607. The following were added to the fermentation after 14 h incubation at 30 C, 0.02% Promod, 0.02% Enzobact, 0.02% Neutral Bacterial Protease, 0.02% Lipomod.

Experimental samples containing (a) 0.2% a-ketoglutarate, (b) 0.2% α-keto isocaproic acid, and (c) 0.2% α-ketoglutarate plus 0.2% leucine. Control samples did not contain any addition of free amino acid or keto acid.

Samples were incubated at 30° C. for 48h. Samples were heat-treated at 63° C. for 30 min to inactivate the enzymes. Each of the samples was evaluated organoleptically for flavor. Experimental samples (a) and (c) were evaluated to have a cheesier flavor as compared to the control sample. Sample (b) was judged to be greener, nutty, malty, and chocolaty.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is being claimed is:

1. A method for accelerating development of cheese flavor for use in edible food products comprising the steps of:
   (a) contacting a protein containing dairy product having a pH of about 6 to about 7 with a lactic acid culture at a temperature of about 25 to about 45° C. for about 8 to about 72 hours to form a reaction mixture that includes peptides and free amino acids, wherein the protein containing dairy product is milk, milk concentrate, whey, whey concentrate, whey substrate, or mixtures thereof;
   (b) contacting the reaction mixture with amino acid oxidase to deaminate the peptides and free amino acids to provide α-keto acids;

wherein the α-keto acids are further metabolized within the reaction mixture to provide flavor compounds which, when incorporated into the edible food products, impart or intensify cheese flavor therein without adversely impacting the edible food products' organoleptic properties.

2. The method of claim 1, wherein step (a) further comprises the step of contacting the protein containing dairy product with a protease enzyme.

3. The method of claim 2, wherein step (a) further comprises the step of contacting the protein containing dairy product with a peptidase enzyme.

4. The method of claim 1 further comprising after step (b) heating to a temperature from about 60° C. to about 80° C. for a time period from about 15 seconds to about 1 hour.

5. The method of claim 4 wherein heating is at a temperature of about 74° C. for about 16 seconds.

6. The method of claim 4 wherein heating is at a temperature of about 63.5° C. for about 30 minutes.

7. The method of claim 1, wherein step (a) further comprises adding at least one free amino acid to the reaction mixture.

8. The method of claim 7, wherein the free amino acid is selected from isoleucine, leucine, valine, phenylalanine, tryptophan, methionine or any combination thereof.

9. The method of claim 1, wherein step (b) further comprises the step of oxygenating.

10. The method of claim 1, wherein step (b) further comprises adding catalase enzyme.

11. The method of claim 10, wherein step (b) further comprises adding hydrogen peroxide.

12. The method of claim 1, wherein step (b) further comprises adding aminotransferase.

13. The method of claim 12, wherein step (b) further comprises adding an amino group acceptor.

14. The method of claim 1 wherein the lactic acid culture is selected from the group consisting of *Lactobacillus bulgaricus, Lactobacillus lactis, Lactobacillus helveticus, Lactobacillus delbrueckii* ss. *lactis, Streptococcus thermophilus Lactococcus lactis* subsp. *lactis, Lactococcus lactis* subsp. *cremoris, Lactococcus lactis* subsp. *lactis biovar diacetylactis, Leuconostoc lactis, Leuconostoc mesenteroides* subsp. *cremoris, Pediococcus pentosaceus, and Lactobacillus casei*, and mixtures thereof.

15. A process for preparing a cheese flavored food product, said method comprising: (a) preparing a cheese or dairy base; (b) incorporating into the cheese or dairy base about 1 to about 10 percent of a cultured cheese concentrate, wherein the cultured cheese concentrate is provided by
    (a) contacting a protein containing dairy product having a pH of about 6 to about 7 with a lactic acid culture at a temperature of about 25 to about 45° C. for about 8 to about 72 hours to form a reaction mixture that includes peptides and free amino acids, wherein the protein containing dairy product is milk, milk concentrate, whey, whey concentrate, whey substrate, or mixtures thereof;
    (b) contacting the reaction mixture with amino acid oxidase to deaminate the peptides and free amino acids to provide α-keto acids;
    wherein the α-keto acids are further metabolized within the reaction mixture to provide flavor compounds and wherein the flavor compounds, when incorporated into the food product, impart or intensify cheese flavor therein without adversely impacting the edible food product's organoleptic properties.

16. The process of claim 15, wherein the cheese or dairy base is selected from the group consisting of process cheese, cheese spread, cream cheese, cottage cheese, natural cheese, and cheese analog.

17. A method for preparing a cheese flavor concentrate for use in edible food products comprising the steps of:
    (a) contacting a protein containing dairy product having a pH of about 6 to about 7 with a lactic acid culture and an enzyme composition at a temperature of about 25 to about 45° C. for about 8 to about 72 hours to form a reaction mixture that includes peptides and free amino acids, wherein the protein containing dairy product is milk, milk concentrate, whey, whey concentrate, whey substrate, or mixtures thereof and wherein the enzyme composition consists essentially of (1) a protease enzyme or (2) the protease enzyme and at least one additional enzyme selected from the group consisting of a peptidase enzyme, a lipase enzyme, and mixtures thereof;
    (b) contacting the reaction mixture with amino acid oxidase to deaminate the peptides and free amino acids to provide α-keto acids, wherein the α-keto acids are further metabolized within the reaction mixture to provide flavor compounds; and
    (c) inactivating enzymes in the reaction mixture containing flavor compounds to form the cheese flavor concentrate, wherein the cheese flavor concentrate, when incorporated into edible food products, imparts or intensifies cheese flavor therein without adversely impacting the edible food products' organoleptic properties.

18. The process of claim 17, wherein the enzyme composition consists essentially of the protease enzyme.

19. The process of claim 17, wherein the enzyme composition consists essentially of the protease enzyme and the peptidase enzyme.

20. The process of claim 17, wherein the enzyme composition consists essentially of the protease enzyme, the peptidase enzyme, and the lipase enzyme.

* * * * *